(12) United States Patent
Iijima et al.

(10) Patent No.: US 9,007,019 B2
(45) Date of Patent: Apr. 14, 2015

(54) NON-CONTACT CHARGING METHOD (71) Applicant: Sanyo Electric Co., Ltd., Moriguchi, Osaka (JP)

(72) Inventors: Yasuhiro Iijima, Sumoto (JP); Sadao Minami, Awaji (JP); Yuki Makita, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 272 days.

(21) Appl. No.: 13/715,156

(22) Filed: Dec. 14, 2012

(65) Prior Publication Data
US 2013/0162220 A1    Jun. 27, 2013

(30) Foreign Application Priority Data
Dec. 27, 2011 (JP) .................................. 2011-286887

(51) Int. Cl.
*H02J 7/00* (2006.01)
*H02J 5/00* (2006.01)

(52) U.S. Cl.
CPC .............. *H02J 7/0052* (2013.01); *H02J 5/005* (2013.01)

(58) Field of Classification Search
USPC ........................................................ 320/108
See application file for complete search history.

(56) References Cited

U.S. PATENT DOCUMENTS

2009/0133942 A1* 5/2009 Iisaka et al. ...................... 178/43
2010/0084918 A1* 4/2010 Fells et al. ........................ 307/32

FOREIGN PATENT DOCUMENTS

JP        2008-017562        1/2008

* cited by examiner

*Primary Examiner* — Samuel Berhanu
(74) *Attorney, Agent, or Firm* — Wenderoth, Lind & Ponack, LLP (57) ABSTRACT

A non-contact charging method, in which a battery-powered device is set down on a charging platform, a power receiving coil in the battery-powered device is electromagnetically coupled to a power transmission coil in the charging platform, power is transmitted from the power transmission coil to the power receiving coil by electromagnetic induction, and a battery (52) in the battery-powered device is charged. The charging current of the battery is detected on the battery-powered device side, the transmission efficiency is detected from the detected charging current, the detected transmission efficiency is compared to an efficiency threshold value, it is determined that a foreign object is on the charging platform when the detected charging efficiency is less than the efficiency threshold value and it is determined that a foreign object is not on the charging platform when the detected charging efficiency is greater than the efficiency threshold value.

7 Claims, 6 Drawing Sheets

NON-CONTACT CHARGING METHOD

FIELD OF THE INVENTION

The present invention relates to a non-contact charging method in which a power transmission coil and a power receiving coil are placed close enough to each other to become electromagnetically coupled, power is transmitted from the power transmission coil to the power receiving coil using electromagnetic induction, and the power inducted by the power receiving coil is used to charge a battery. The present invention relates more specifically to a non-contact charging method which detects when a foreign object has been set down on a charging platform.

BACKGROUND

A non-contact charging method has been developed in which a battery-powered device incorporating a power receiving coil is set down on a charging platform incorporating a power transmission coil, power is transmitted from the power transmission coil to the power receiving coil, and the battery in the battery-powered device is charged (see Patent Document 1).

In this non-contact charging method, the battery-powered device is set down on the charging platform so that the receiving coil in the battery-powered device becomes electromagnetically coupled with the power transmission coil in the charging platform. When this occurs, power is transmitted from the power transmission coil to the power receiving coil, and the battery is charged using power induced in the power receiving coil. This charging method does not require connecting the battery-powered device to the charging platform via a connector, and a built-in battery can be charged conveniently using this non-contact method.

When a foreign object such as a metal paper clip has been set down on the charging platform when a battery-powered device is being charged, the induced current flows through the foreign object and it may become hot due to the joule heat. Because induced current flowing through a foreign object is a waste of power, the battery set down on the charging platform is not charged efficiently. In order to eliminate this problem, a plurality of temperature sensors has been installed side-by-side inside the upper surface of the charging platform of Patent Document 1 in both the vertical and horizontal directions. These temperature sensors detect heat from a foreign object set down on the charging platform. When a metal foreign object has been set down on the charging platform, and alternating current power is supplied to the power transmission coil, induced current flows to the foreign object, and the heat generated by the foreign object is detected by the temperature sensor closest to the object.

For example, see Japanese Laid Open Patent Publication No. 2008-17562.

A plurality of temperature sensors has to be installed in the upper surface of the charging surface in order to determine whether a foreign object has been set down. The required number of temperature sensors increases component costs. Also, because a given temperature sensor can detect heat generated by a foreign object only when the foreign object has been set down near the temperature sensor, a foreign object can only be detected when temperature signals are received from all of the temperature sensors. Therefore, the detection circuit required to receive temperature signals from a large number of temperature sensors is complicated. As a result, a foreign object cannot be detected using a simple circuit configuration.

Because a large number of temperature sensors have to be installed in the charging platform on which the battery-powered device is set down, the temperature sensors and the components used to install the temperature sensors are located between the power transmission coil and the power receiving coil. This increases the interval between the power transmission coil and the power receiving coil, and decreases the power transmission efficiency. Because the power transmission coil and the power receiving coil are electromagnetically coupled to transmit power, the interval between the coils has to be reduced in order to perform more efficient power transmission. However, a configuration in which temperature sensors are installed between the power transmission coil and the power receiving coil does not allow the power receiving coil to be brought closer to the power transmission coil. This reduces power transmission efficiency.

The present invention was developed to solve this problem. The most important purpose of the present invention is to provide a non-contact charging method in which the setting down of a foreign object on the charging platform can be detected stably and reliably using a simple circuit configuration, and in which power can be transmitted more efficiently from the power transmission coil to the power receiving coil.

In the non-contact charging method of the present invention, a battery-powered device 50 is set down on a charging platform 10, a power receiving coil 51 in the battery-powered device 50 is electromagnetically coupled to a power transmission coil 11 in the charging platform 10, power is transmitted from the power transmission coil 11 to the power receiving coil 51 by electromagnetic induction, and a battery 52 in the battery-powered device 50 is charged. Also, in the non-contact charging method, the charging current of the battery 52 is detected on the battery-powered device 50 side, the transmission efficiency is detected from the detected charging current, the detected transmission efficiency is compared to an efficiency threshold value, it is determined that a foreign object has been set down on the charging platform 10 when the detected charging efficiency is less than the efficiency threshold value and it is determined that a foreign object has not been set down on the charging platform 10 when the detected charging efficiency is greater than the efficiency threshold value, and foreign object detection is suspended during a time period including a fluctuation in the charging current.

The battery is charged by the power induced in the power receiving coil. Thus, the charging current of the battery is the output of the power receiving coil, that is, the power outputted from rectifier circuit converting the alternating current power from the receiving coil into direct current power. Herein, the "charging current of the battery" is used interchangeably to include the current outputted from the rectifier circuit, and the current outputted from the rectifier circuit can be detected as the charging current of the battery.

In this non-contact charging method, the setting down of a foreign object on the charging platform can be reliably detected using a simple circuit configuration. This is because the battery-powered device can detect the charging current of the battery, detect the transmission efficiency, and compare the detected transmission efficiency to an efficiency threshold value to detect a foreign object. The method can detect when some of the power from the power transmission coil is consumed by a foreign object, thus reducing the power induced in the power receiving coil and reducing the transmission efficiency. Because a large number of temperature sensors does not have to be installed in the charging platform, as in the prior art, the structure and electronic circuitry of the charging platform can be greatly simplified. Because the current detection circuit inside the battery-powered device used to determine when the battery has been completely charged can also be used to detect the charging current, foreign objects can be detected without requiring a special circuit to detect the charging circuit. In this method, a foreign object is detected by detecting the transmission efficiency based on the charging current of the battery. As a result, a foreign object can be detected as soon as it is set down on the charging platform.

In this non-contact charging method, erroneous detection of a foreign object based on fluctuations in the load connected to the battery can also be prevented. Because a foreign object is detected by detecting the transmission efficiency based on the charging current of the battery and then comparing the detected transmission efficiency to an efficiency threshold value, fluctuations in the charging current, and thus transmission efficiency, can cause a foreign object to be erroneously detected. However, in this non-contact charging method, foreign object detection is suspended in a time period including a fluctuation in the charging current. This prevents erroneous detection of a foreign object under these conditions. In other words, foreign objects can be detected stably and reliably.

In the non-contact charging method of the present invention, when a fluctuation occurs in the charging current of the battery 52 and the charging current temporarily rises above or falls below the current change detection threshold value, the period of time including the rise or fall in the charging current above or below the current change detection threshold value is determined to be a time period including a fluctuation in the charging current when the period of time is shorter than a set time period, and foreign object detection is suspended during this time period.

In this non-contact charging method, erroneous detection of a foreign object based on fluctuations in the load connected to the battery can also be prevented while also detecting foreign objects using the transmission efficiency detected based on the charging current of the battery. In a method detecting a foreign object based on the transmission efficiency, a foreign object may be erroneously detected when there is a fluctuation in the load of the battery and the charging currency of the battery fluctuates. For example, when the load of a charged battery falls or the charging of the battery is temporarily stopped on the battery-powered device side, the charging current to the battery, and thus the transmission efficiency, may fall. In a method detecting a foreign object using the transmission efficiency detected from the charging current, the setting down of a foreign object may be erroneously detected even when a foreign object has not been set down. However, in this non-contact charging method, foreign object detection is suspended when the period in which the charging current rises above or falls below the current change detection threshold value, that is, the time in which the charge current fluctuates, is shorter than the set period. As a result, a foreign object is not erroneously detected due to fluctuations in the load of the battery. Because the drop in transmission efficiency is continuous when a foreign object has been set down, the setting down of a foreign object is determined when the transmission efficiency is continuously below the efficiency threshold value. Therefore, the setting down of a foreign object is not erroneously detected when the transmission efficiency temporarily falls below the efficiency threshold value due to a load fluctuation. When the charging current has become constant again, foreign object detection from the transmission efficiency is resumed. Thus, the setting down of foreign objects can be reliably detected.

In the non-contact charging method of the present invention, when a charging current greater than the current change detection threshold value falls below the current change detection threshold value or a charging current less than the current change detection threshold value rises above the current change detection threshold value, a predetermined time period can be set as the time period including a fluctuation in the charging current in the time period once the charging current passes the current change detection threshold value, and foreign object detection can be suspended during this time period.

In the non-contact charging method of the present invention, the charging current for the battery 52 is detected on the battery-powered device 50 side, the detected charging current and the efficiency threshold value are transmitted to the charging platform 10, and the charging platform 10 performs foreign object detection from the charging current and the efficiency threshold value. Because, in this non-contact charging method, foreign object detection is performed using the charging current for the battery and efficiency threshold value provided by the battery-powered device, the supply of power to the power transmission coil can be controlled when a foreign object has been detected, and heating of the foreign object can be prevented.

In the non-contact charging method of the present invention, the power supplied to the power transmission coil 11 is controlled when a foreign object is detected on the charging platform 10. In this non-contact charging method, the supply of power to the power transmission coil can be reduced or the supply of power to the power transmission coil can be suspended when a foreign object has been detected, and hazards such as the heating of a foreign object can be reliably prevented.

In the non-contact charging method of the present invention, the efficiency threshold value used to compare the detected transmission efficiency can be set to a lowest threshold value, and foreign object detection is effectively stopped during a time period including a fluctuation in the charging current. This non-contact charging method can substantially suspend detection of foreign objects by reducing the efficiency threshold value.

Also, in the non-contact charging method of the present invention, the lowest threshold value can be level 0. This non-contact charging method can substantially suspend detection of foreign objects by changing the efficiency threshold value.

In the non-contact charging method of the present invention, the supply of power to the power transmission coil 11 can be stopped and charging of the battery 52 stopped, or the power introduced to the power transmission coil 11 can be reduced below a power setting, and the amount of charging current for the battery 52 reduced when a foreign object is detected. This method prevents heating of a foreign object set down on the charging platform, or allows the battery in a battery-powered device to be charged while reducing the heating of the foreign object.

DETAILED DESCRIPTION OF THE INVENTION

The following is an explanation of examples of the present invention with reference to the drawings. The examples shown below exemplify the technical concepts of the non-contact charging method of the present invention. The non-contact charging method of the present invention is not limited to the method and circuit configuration described below. In order to make the claims easier to understand, the reference numbers for components in the examples have been added to the "claims" and "means of solving the problem" sections of the specification. However, the components indicated in the claims do not necessarily specify the components in the examples.

Figure 1:
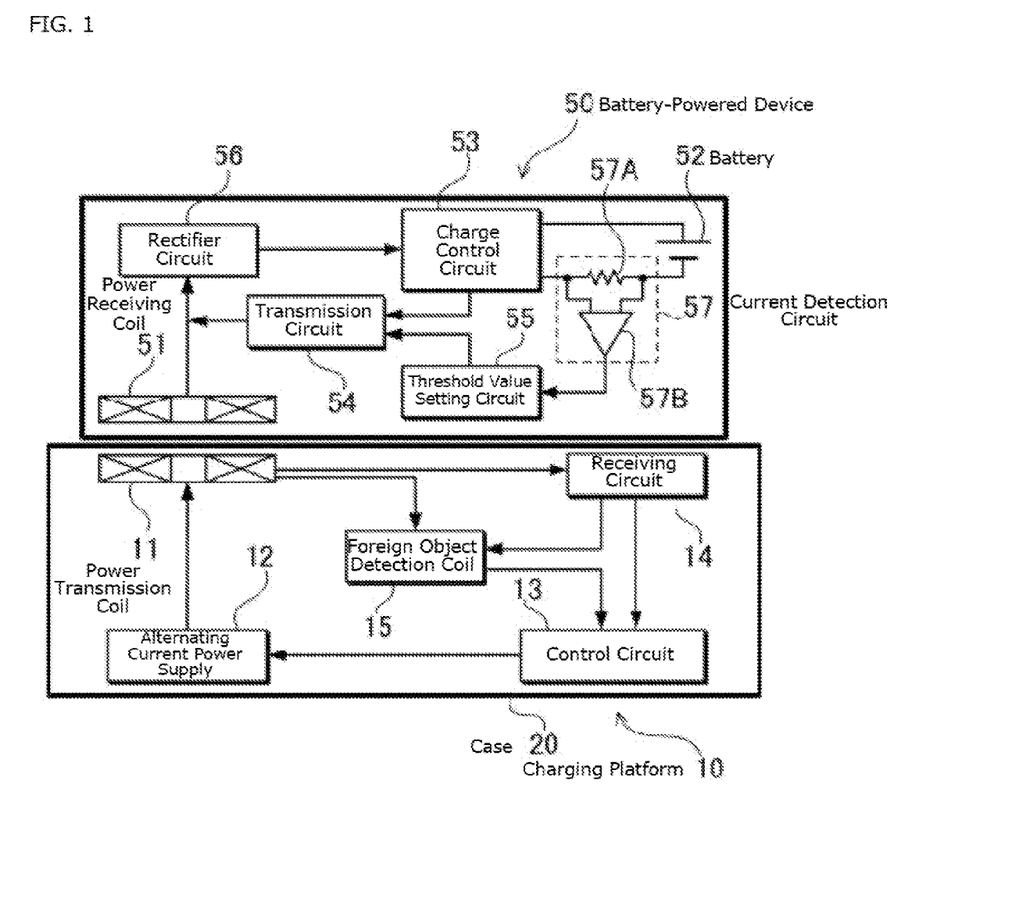
FIG. 1 is a block diagram showing a battery inside a battery powered device set down on a charging platform being charged using a non-contact charging method in an embodiment of the present invention.

FIG. 1 shows a battery-powered device 50 set down on a charging platform 10, and the battery 52 inside the battery-powered device 50 being charged using a non-contact charging method of the present invention.

In the charging platform 10, an upper plate (not shown) is provided on the top surface of the case 20. A battery-powered device 50 is placed on top of this upper plate, and a power transmission coil 11 is arranged inside this upper plate. The power transmission coil 11 is connected to an alternating current power supply 12, and the alternating current power supply 12 is controlled by a control circuit 13. The receiving circuit 14 detects the detection signals transmitted from a transmission circuit 54 in the battery-powered device 50, and the control circuit 13 uses the detection signals to control the power supplied to the power transmission coil 11. A foreign object detection circuit 15 is installed in the charging platform 10 to detect the transmission efficiency (=power transmission efficiency) from the charging current and the charging voltage of the battery transmitted by the battery-powered device 50. The detected transmission efficiency is then compared by the circuit to a predetermined efficiency threshold value to determine whether a foreign object has been set down on the charging platform 10 while the battery-powered device 50 is being charged.

In the charging platform 10, the transmission coil 11 is electromagnetically coupled to the power receiving coil 51, and power is transmitted from the power transmission coil 11 to the power receiving coil 51. The battery-powered device 50 is set down anywhere on the upper plate, and the charging platform 10 charging the battery 52 includes a mechanism (not shown) which moves the power transmission coil 11 closer to the power receiving coil 51. In the charging platform 10, the power transmission coil 11 is arranged below the upper plate of the case 20, and is moved along the upper plate towards the power receiving coil 51. However, the charging platform does not have to include a mechanism for moving the power transmission coil closer to the power receiving coil. The platform can be structured so that the battery-powered device is set down in a fixed location on the charging platform.

The power transmission coil 11 is a flat coil wound in a spiral shape on a plane parallel to the upper plate, so that an alternating current magnetic flux is emitted above the upper plate. The power transmission coil 11 emits an alternating current magnetic flux orthogonal to the upper plate above the upper plate. Alternating current power is supplied to the power transmission coil 11 from an alternating current power supply 12, and an alternating current magnetic flux is emitted above the upper plate. The inductance of the power transmission coil 11 can be increased by winding a metal wire around a core made of a magnetic material (not shown). In a power transmission coil with a core, the magnetic flux converges in a particular portion which enables the power to be transmitted to the power receiving coil more efficiently. The power transmission coil does not have to have a core. The coil may be hollow. Because a hollow coil is lighter, the power transmission coil can be moved inside the upper plate using a simpler moving mechanism. The outer diameter of the power transmission coil 11 is substantially equal to that of the power receiving coil 51, which enables more efficient transmission of power to the power receiving coil 51.

The alternating current power supply 12, for example, supplies 20 kHz to 1 MHz high-frequency power to the power transmission coil 11. In a charging platform 10 which moves the power transmission coil 11 closer to the power receiving coil 51, the alternating current power supply 12 is connected to the power transmission coil 11 using flexible lead wires. The alternating current power supply 12 includes an oscillation circuit and a power amplifier for amplifying the alternating current outputted from the oscillating circuit.

In the charging platform 10, alternating current power is supplied to the power transmission coil 11 by the alternating current power supply 12 when the power transmission coil 11 has been brought closer to the power receiving coil 51. The alternating current power of the power transmission coil 11 is transmitted to the power receiving coil 51, and the battery 52 is charged. When the battery 52 has been fully charged, the supply of power to the power transmission coil 11 in the charging platform 10 is stopped by a full-charge signal transmitted by the battery-powered device 50, and the charging of the battery 52 is ended.

The foreign object detection circuit 15 detects the transmission efficiency of power from the charging platform 10 to the battery-powered device 50, and compares the detected transmission efficiency to a predetermined efficiency threshold value to detect a foreign object. When the transmission efficiency is lower than the efficiency threshold value, the foreign object detection circuit 15 determines that a foreign object has been set down on the charging platform 10, and the alternating current power supply 12 is controlled by the control circuit 13. The foreign object detection circuit 15 suspends foreign object detection during a period of time in which the charging current of the battery 52 fluctuates. As a result, foreign object detection is suspended and the setting down of a foreign object is not detected during a period of time in which the charging current fluctuates and the detected transmission efficiency falls below the efficiency threshold value. This is because the load of the battery 52 may fluctuate, the charging current may change, and the transmission efficiency may fluctuate even when a foreign object has not been set down on the platform. During a period of time in which the charging current does not fluctuate, the foreign object detection circuit 15 determines that a foreign object has been set down on the platform when the detected transmission efficiency falls below the efficiency threshold value. During the same period, the circuit determines that a foreign object has not been set down and charges the battery 52 when the detected transmission efficiency is greater than the efficiency threshold value.

In FIG. 1, the foreign object detection circuit 15 is installed in the charging platform. However, a foreign object detection circuit can be installed in a battery-powered device. When a foreign object detection circuit has been installed in a battery-powered device, the transmission efficiency detected based on the charging current and charging current of the battery is compared to the efficiency threshold value to detect a foreign object. The foreign object detection circuit built into the battery-powered device then transmits a foreign object detection signal indicating detection of a foreign object to the charging platform. The charging platform receives the foreign object detection signal and controls the output of the alternating current power supply using the control circuit.

The power receiving coil 51 electromagnetically coupled to the power transmission coil 11 in the charging platform 10 is built into the battery-powered device 50, and the battery 52 is charged using the power induced in the power receiving coil 51. The battery-powered device 50 is a portable device containing a chargeable battery 52. Examples of portable devices containing at least one chargeable battery include a battery pack, mobile phone, portable music player, and a charger with built-in batteries for charging another portable device.

The battery-powered device 50 in FIG. 1 includes a battery 52, a power receiving coil 51, a rectifier circuit 56 for converting the alternating current induced in the power receiving circuit 51 into direct current, a current detection circuit 57 for detecting the charging current of the battery 52, a threshold value setting circuit 55 for setting the efficiency threshold value, and a transmission circuit 54 for transmitting the current detected by the current detection circuit 57 and the efficiency threshold value set by the threshold value setting circuit 55 to the charging platform 10. The battery-powered device 50 shown in the drawing charges the built-in battery 52 via a charge control circuit 53. A charge control circuit does not have to be installed in the battery-powered device. The power outputted from the rectifier circuit can be supplied directly to the battery to charge the battery. The battery-powered device can be a detachable battery pack containing chargeable batteries. While not shown in the drawing, this battery pack can include batteries, a charge control circuit for charging the batteries using direct current outputted from the rectifier circuit, and a current detection circuit for detecting the charging current of the batteries. The charging current detected by the charge detection circuit can be outputted as a signal from the battery pack, and inputted to the threshold value setting circuit.

The battery 52 is a lithium-ion battery or a lithium polymer battery. However, the battery can be any chargeable battery such as a nickel-metal-hydride battery or a nickel-cadmium battery. The battery-powered device 50 can contain one or more batteries 52. The batteries can be connected in series and/or in parallel.

While not shown in the drawing, the rectifier circuit 56 performs full-wave rectification on the alternating current induced in the power receiving coil 51 using a diode bridge, and smoothes the pulsating current using a smoothing capacitor. In the rectifier circuit, the alternating current is rectified using a diode bridge. However, the rectifier circuit can also be a synchronous rectifier circuit in which a FET is connected to a bridge to synchronize with the alternating current, and the FET is turned ON and OFF to rectify the alternating current. In a synchronous rectifier circuit with a FET, the ON resistance, the heat generated by the rectifier circuit, and the rise in temperature inside the case of the battery-powered device can be reduced. A smoothing capacitor is not required. The battery can be charged using the output from a diode bridge or a synchronous rectifier circuit.

The charge control circuit 53 charges a lithium ion battery or lithium polymer battery using constant voltage/constant current charging, and charges a nickel-metal-hydride battery or nickel-cadmium battery using constant current charging. The charge control circuit 53 detects a fully charged battery 52, and transmits a full-charge signal to the charging platform 10 via the transmission circuit 54. The charging platform 10 detects the full-charge signal transmitted by the transmission circuit 54 via the receiving circuit 14. When a full-charge signal has been detected, the control circuit 13 controls the alternating current power supply 12 and stops the supply of power to the power transmission coil 11.

The transmission circuit 54 transmits various transmission signals such as the charging current and charging voltage of the battery 52, the efficiency threshold value signal, the full-charge signal of the battery 52, and an ID signal from the battery-powered device 50 to the charging platform 10. The transmission circuit 54 changes the load impedance of the power receiving coil 51, and transmits various transmission signals to the power transmission coil 11. While not shown in the drawing, the transmission circuit 54 connects a modulation circuit to the power receiving coil 51. In the modulation circuit, a load such as a capacitor or resistor and a switching element are connected in series, and the switching element is turned ON and OFF to transmit various transmission signals to the charging platform 10.

The receiving circuit 14 in the charging platform 10 detects changes in the impedance, voltage and current of the power transmission coil 11, and detects transmission signals transmitted from the transmission circuit 54. When the load impedance of the power receiving coil 51 changes, the impedance, voltage and current of the power transmission coil 11 electromagnetically coupled to this coil also change. Thus, the receiving circuit 14 can detect these changes, and detect transmission signals from the battery-powered device 50.

However, the transmission circuit can be a circuit that modulates and transmits carrier waves. In other words, it can act as a transmitter. The receiving circuit for the signals transmitted from the transmission circuit is a receiver that receives the carrier waves and detects the transmission signals. The transmission circuit and the receiving circuit can be an overall circuit configuration able to transmit transmission signals from the battery-powered device to the charging platform.

The current detection circuit 57 detects the charging current of the battery 52. The current detection circuit 57 in FIG. 1 includes a current sensing resistor 57A connected in series to the battery 52, and a difference amplifier 57B for amplifying the voltage at both ends of the current sensing resistor 57A. The charging current of the battery 52 is detected from the output of the difference amplifier 57B. The charging current of the battery 52 is the output of the rectifier circuit 56, that is, the power induced in the power receiving coil 51. Therefore, the charging current of the battery 52 can be detected by detecting the current outputted from the rectifier circuit 56, or by detecting the output from the power receiving coil 51.

The threshold value setting circuit 55 sets the efficiency threshold value for comparison to the detected transmission efficiency in order to detect a foreign object. The efficiency threshold value is the threshold value of the transmission efficiency, which is compared to the detected transmission efficiency to determine whether or not a foreign object has been set down on the charging platform 10, that is, to detect a foreign object. When the transmission efficiency for the electric power transmitted from the charging platform 10 to the battery-powered device 50 has fallen below the efficiency threshold value, it is determined that a foreign object has been set down on the charging platform 10. When the transmission threshold value is greater than the efficiency threshold value, it is determined that a foreign object has not been set down on the platform. The efficiency threshold value is set to take into account the charging current. The threshold value setting circuit 55 stores the efficiency threshold values for the various charging currents of the battery 52. This is because a higher charging current means more power induced in the power receiving coil 51 and higher transmission efficiency. In a charging method that reduces the charging current as a full charge is approached, or when there is a fluctuation in the load consuming electric power outputted from the battery 52 in the battery-powered device 50, or when the input of power from the power receiving coil 51 to the battery 52 is discontinued, for example, because an AC/DC adapter (not shown) has been connected to the battery-powered device 50, the efficiency threshold value is changed depending on the charging current of the battery 52. This is because, when the charging current falls, the efficiency threshold value also falls so that a foreign object can be reliably detected.

Figure 2:
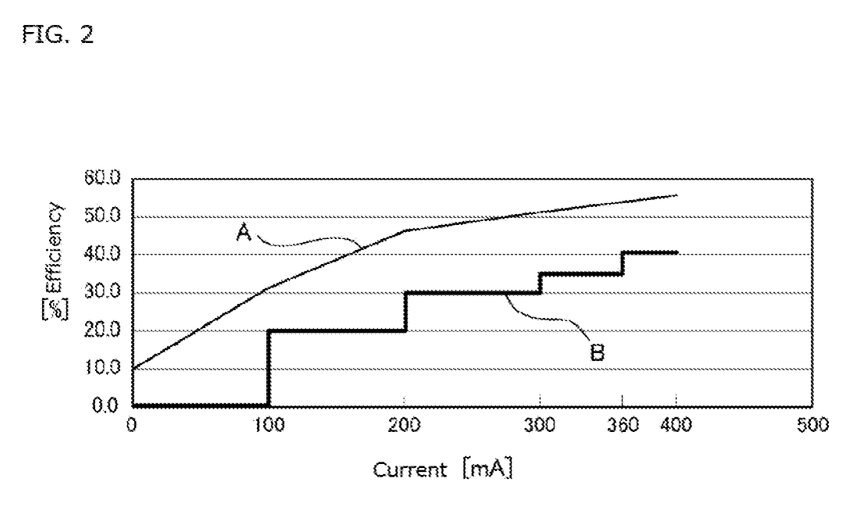
FIG. 2 is a graph showing an example of the transmission efficiency being changed by the charging current, and showing efficiency threshold values for the charging current.

The threshold value setting circuit 55 can store the efficiency threshold values for each charging current of the battery 52 as a table or as a function. Curve B in FIG. 2 is an example of efficiency threshold values relative to charging currents for a battery 52. The efficiency threshold values shown in Curve B change in step-like fashion relative to the charging current. In Curve B, the efficiency threshold value for a charging current greater than 360 mA is 41%, the efficiency threshold value for a charging current from 360 mA to 300 mA is 35%, the efficiency threshold value for a charging current from 300 mA to 200 mA is 30%, and the efficiency threshold value for a charging current from 200 mA to 100 mA is 20%. The efficiency threshold value for a charging current less than 100 mA is 0% because very little heat is generated by a foreign object in this current range. The efficiency threshold value can also be changed in linear or curved fashion relative to the charging currents.

The transmission efficiency is detected using the following equation from the ratio of the power inputted to the transmission coil 11 and the power induced in the power receiving coil 51 when a battery-powered device 50 is set down in a fixed position on the charging platform 10 and a foreign object is not present on the charging platform 10.

$$\text{Transmission Efficiency}[\%]=(\text{power induced in the power receiving coil}/\text{power inputted to the power transmission coil}) \times 100$$

The power induced in the power receiving coil 51 is detected as the product of the outputted voltage of the rectifier circuit 56 (=charging voltage) and the current, and the power inputted to the power transmission coil 11 is detected as the product of the output of the alternating current power supply 12, that is, the output voltage of the alternating current power supply 12, and the current.

The current used to charge the battery 52 changes depending on the state of the battery 52. For example, the charging current is gradually reduced as the voltage of a battery 52 charged using constant-voltage/constant-current charging rises to the set voltage. The state of the battery 52 is transmitted from the transmission circuit 54 of the battery-operated device 50 to the receiving circuit 14 of the charging platform 10. The charging platform 10 detects the signals transmitted from the battery-powered device 50 using the receiving circuit 14, and inputs the signals to the control circuit 13. The control circuit 13 controls the output of the alternating current power supply 12 based on the inputted signals, and controls the power supplied to the power transmission coil 11. When the charging platform 10 has detected via the receiving circuit 14 that the temperature of the battery 52 is greater than a set value, the control circuit 13 reduces the output of the alternating current power supply 12, the power induced in the power receiving coil 51, and the charging current of the battery 52. Also, when a lithium ion battery or lithium polymer battery is charged using constant-current charging, and the voltage of the battery rises above a set voltage, constant-voltage charging is performed and the charging current is gradually reduced.

The transmission efficiency relative to the charging current of the battery 52 is changed depending on the charging current of the battery 52. Curve A in FIG. 2 shows the characteristics of the change in the transmission efficiency based on the charging current of the battery 52. As shown in Curve A, the transmission efficiency is reduced as the charging current of the battery 52 is reduced. Curve A shows the transmission efficiency when a foreign object has not been set down on the platform. In Curve A, the transmission efficiency is approximately 55% when the charging current of the battery 52 is 400 mA, and the transmission efficiency falls as the charging current is reduced. The transmission efficiency falls when a foreign object is set down on the charging platform 10. The foreign object absorbs some of the power from the power transmission coil 11, and the power induced in the power receiving coil 51 is lowered. Here, Curve B in FIG. 2 shows the efficiency threshold value relative to the charging current described above in step-like fashion. A transmission efficiency 10% to 30% lower than the transmission efficiency shown in Curve A is the efficiency threshold value. However, the efficiency threshold value for detecting a foreign object can be set at a threshold value 5% to 40% lower than the transmission efficiency shown in Curve A.

When a battery-powered device 50 has been set down on the charging platform 10 to charge the battery 52 and a foreign object has been placed along with the battery-powered device 50 on the charging platform 10, the foreign object reduces the transmission efficiency, and the charging current of the battery 52 is less than the normal charging current when a foreign object has not been set down on the platform. When the transmission efficiency is lower than the efficiency threshold value, it is determined that a foreign object has been set down on the platform. In order to realize this, the battery-powered device 50 detects the charging current and the charging voltage, and transmits them to the charging platform 10. Also, the battery-powered device 50 transmits the efficiency threshold value relative to the charging current to the charging platform. The charging platform 10 calculates and determines the transmission efficiency from the product of the charging current and the charging voltage transmitted from the battery-powered device 50 and from the power inputted to the power transmission coil 11 based on the equation described above. This transmission efficiency is then compared to the efficiency threshold value to determine whether a foreign object has been set down on the platform.

The charging current and transmission efficiency of the battery 52 may change for reasons other than a foreign object being set down on the platform. For example, it may change because of a fluctuation in the load of the battery 52. When the load of the battery 52 being charged is reduced and the voltage of the battery 52 rises, the charging current is reduced. Various controls performed using the battery-powered device 50 may also change the charging current of the battery 52.

When the load of the battery 52 fluctuates, the current changes, and the transmission efficiency falls below the efficiency threshold value, the setting down of a foreign object may be erroneously detected. In order to eliminate this problem, the foreign object detection circuit 15 sets a period of time in which the charging current of the battery 52 falls below the current change detection threshold value as a period of charging current fluctuation, and suspends foreign object detection during this period. A fall in the charging current due to a fluctuation in the load of the battery 52 does not last very long. In contrast, a fall in the charging current due to a foreign object being set down on the platform lasts until the foreign object is removed. Therefore, foreign object detection can be resumed and foreign objects can be detected when the charging current continues to remain stable after suspension of foreign object detection.

When a foreign object has been set down on the charging platform 10, some of the power from the power transmission coil 11 is absorbed by the foreign object, and the charging current of the battery 52 falls and then stabilizes at a constant current value. In contrast, a reduction in the charging current due to a fluctuation in the load of the battery 52 results in a current that fluctuates and is not constant. While not shown in FIG. 1, both ends of the battery 52 are connected to a load in the battery-powered device 50, and fluctuations in the load may result from, for example, turning the liquid crystal display ON or OFF or turning output from the battery 52 ON or OFF when placing a call on a mobile phone. When foreign object detection is performed during a load fluctuation, that is, when the charging current fluctuates, a foreign object may be erroneously detected. In order to avoid this problem, foreign object detection is suspended during a period of time in which a fluctuation occurs in the charging current. When the charging current of the battery 52 is stable and does not fluctuate, the transmission efficiency is compared to the efficiency threshold value, and a foreign object is detected only if the transmission efficiency falls below the efficiency threshold value. This prevents erroneous detection of a foreign object due to a fluctuation in the load of the battery 52.

Figure 3:
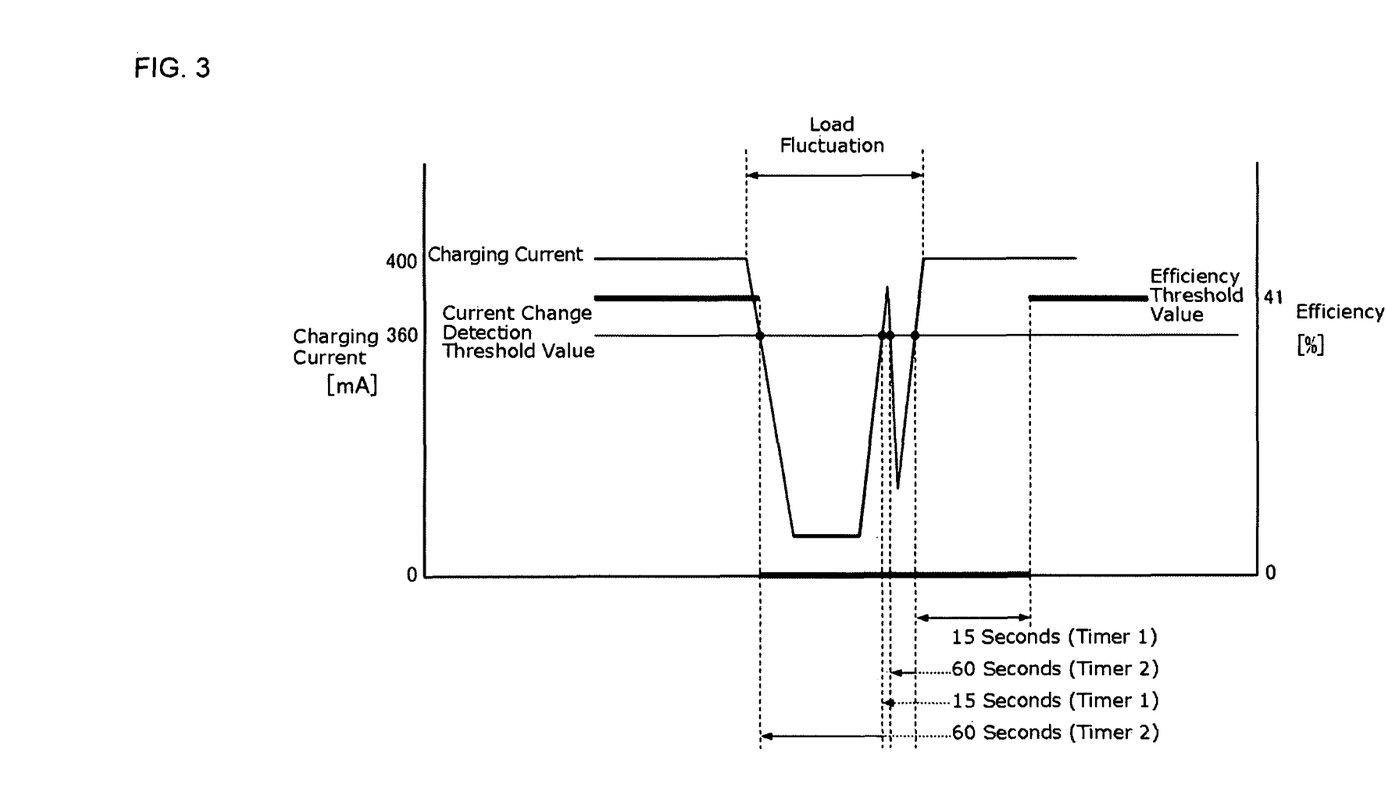
FIG. 3 is a diagram showing an example in which a foreign object is detected during a change in the charging current.

A period of time in which the charging current fluctuates is determined by comparing the charging current to the current change detection threshold value. When the charging current fluctuates and rises above or falls below the current change detection threshold value, a fixed period of time after the fluctuation is treated as a charging current fluctuation period, and foreign object detection is suspended. In FIG. 3, during the normal state when a foreign object has not been set down on the platform, the current change detection threshold value for a battery 52 charged at 400 mA is 360 mA. In other words, a current change detection threshold value of 360 mA is set for detecting a fluctuation in the charging current of the battery 52. Foreign object detection is suspended for a fixed period of time each time the charging current of the battery 52 exceeds the current change detection threshold value. Here, the charging current of the battery exceeding the current change detection threshold value means the charging current of the battery either falls from a value greater than the current change detection threshold value to a value smaller than the current change detection threshold value, or rises from a value smaller than the current change detection threshold value to a value greater than the current change detection threshold value. In other words, it means the charging current of the battery has changed across the current change detection threshold value.

When the charging current of the battery 52 falls below 360 mA, a fixed period of time is set as a charging current fluctuation period, the efficiency threshold value is set to the lowest threshold value (level 0 in FIG. 3), and foreign object detection is suspended. Because the lowest threshold value is lower than the lowest value that the transmission efficiency will ever fall to below the threshold value, the transmission efficiency never falls below the lowest threshold value, and foreign object detection is effectively stopped. When the state in which the charging current is below 360 mA continues for a set period of time (for example, 60 seconds; see timer 2 in the flowchart described below), current is stable and foreign object detection is resumed. In order to realize this, a timer is installed (timer 2 in the flowchart described below) to resume the count from the time at which the charging current falls below 360 mA. The charge current fluctuation period lasts until the timer times out. When the timer times out without the charging current exceeding the current change detection threshold value and the charging current has remained below 360 mA, the efficiency threshold value is changed from the lowest threshold value to a threshold value set by the charging current, and foreign object detection is resumed. When foreign object detection has been resumed, and the detected transmission efficiency falls below the efficiency threshold value, the setting down of a foreign object is detected.

When the setting down of a foreign object has been detected, the foreign object detection circuit 15 inputs a foreign object detection signal to the control circuit 13. When a foreign object detection signal has been detected, the control circuit 13 controls the output of the alternating current power supply 12, and the supply of power to the power transmission coil 11 is stopped or lowered. When the output of the power transmission coil 11 falls below a set value, the charging current of the battery 52 is sufficiently low, and the hazard of the foreign object can be sufficiently ignored, the control circuit 13 does not stop or does not lower the supply of power to the power transmission coil 11 after a foreign object detection signal is detected.

When, in FIG. 3, a charging current lower than 360 mA rises above 360 mA, and a set period of time (for example, 15 seconds; see timer 1 in the flowchart described below) has elapsed, the period of charging current fluctuation is ended, the threshold value set as the lowest threshold value is changed to an efficiency threshold value relative to the charging current (for example, 41%), and foreign object detection is resumed. In order to count the time when the charging current exceeds 360 mA, a timer (timer 1 in the flowchart described below) can be installed which has a set time, for example, of 15 seconds. This timer begins counting at the time the charging current exceeds 360 mA, and continues until it times out. When the charging current is above 360 mA, the time period in which the charging current fluctuates comes to an end, and the threshold value set to the lowest threshold value is reset to an efficiency threshold value relative to the charging current, and foreign object detection is resumed. This is because the charging current is usually stable in a constant charging current range when the set time period (15 seconds) of the timer counting the time period in which the charging current is higher than 360 mA (timer 1 in the flowchart described below) is shorter than the set period (60 seconds) of the timer counting the time period in which the charging current is lower than 360 mA (timer 2 in the flowchart described below).

In order to determine the time period of charging current fluctuation, as shown in FIG. 3, a timer 1 (set time=15 seconds) which begins counting when the charging current is greater than 360 mA, and a timer 2 (set time=60 seconds) which begins counting when the charging current is lower than 360 mA are provided. The time period in which both timer 1 and timer 2 are counting is a period of time in which the charging current is fluctuating. Timer 1 begins counting at the time the charging current exceeds the current change detection threshold value of 360 mA. However, when the charging current falls below 360 mA before the timer times out, timer 1 stops counting and is reset. It does not begin to recount until the charging current again exceeds 360 mA. Timer 2 begins counting at the time the charging current falls below the current change detection threshold value of 360 mA. However, when the charging current rises above 360 mA before the timer times out, timer 2 stops counting and is reset. It does not begin to recount until the charging current again falls below 360 mA.

A battery 52 is not uniformly charged at a constant current even when it is in the normal state and a foreign object has not been set down on the platform. For example, a lithium ion battery and a lithium polymer battery are charged at a constant current until the voltage rises to a predetermined voltage (from 4.1 V/cell to 4.2 V/cell). For example, they are charged at a constant current of 400 mA until the voltage rises to the predetermined voltage. After the voltage of the battery 52 has risen to the predetermined voltage, the charging current is gradually decreased so that the voltage of the battery 52 no longer rises.

Figure 4:
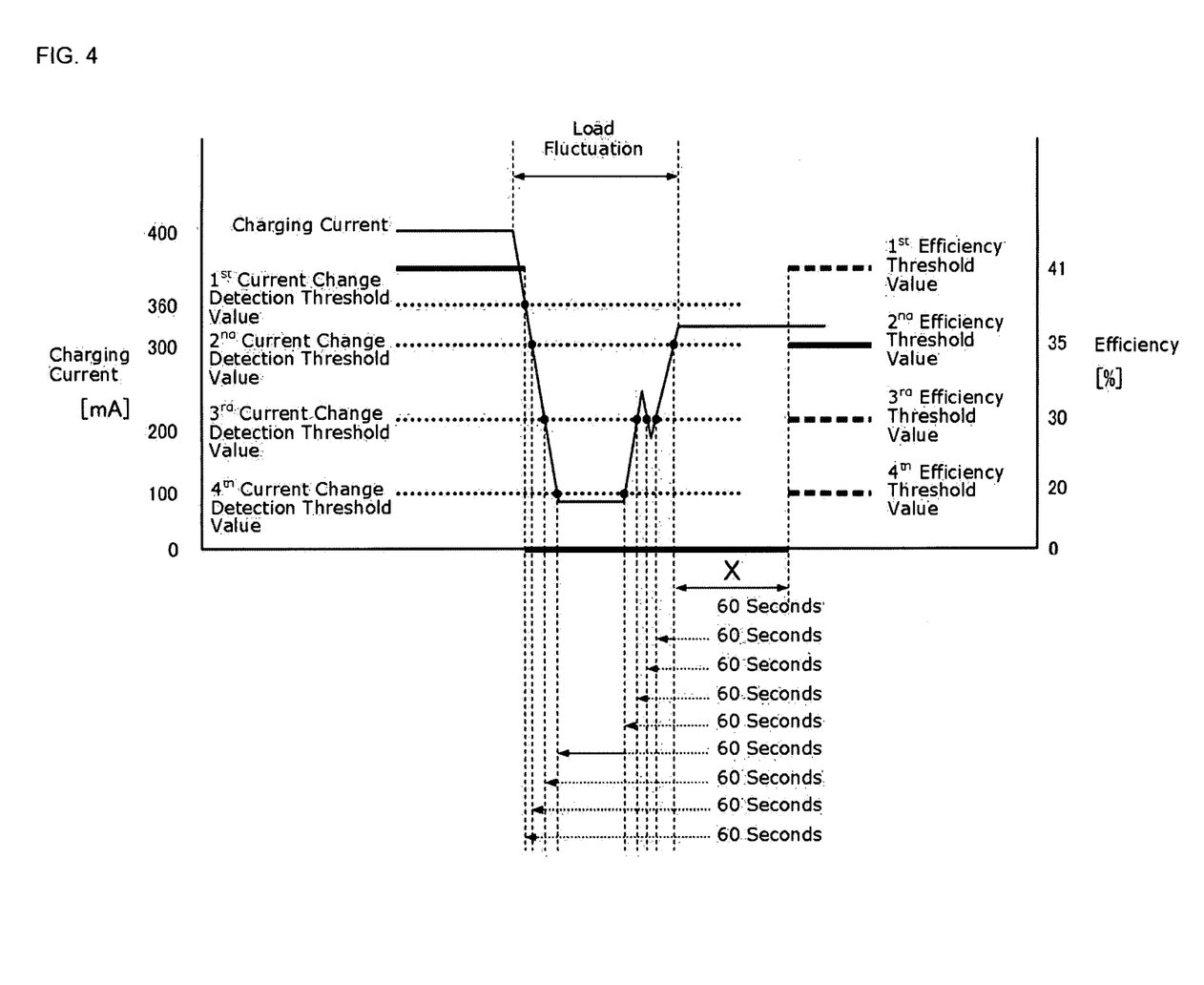
FIG. 4 is a diagram showing another example in which a foreign object is detected during a change in the charging current.

FIG. 4 shows a situation in which a plurality of current change detection threshold values have been provided so that foreign objects can be reliably detected when the charging current is reduced or when the load fluctuates. In the charging method shown in this drawing, a plurality of current change detection threshold values are provided. When the charging current of the battery 52 falls below the initial current change detection threshold value (360 mA in FIG. 4), the efficiency threshold value is set to the lowest threshold value (level 0 in FIG. 4), and foreign object detection is suspended. Each time the charging current falls and then exceeds the current change detection threshold value, foreign object detection is suspended for a fixed time serving as the charging current fluctuation time period. When the charging current of the battery 52 does not exceed the charging current detection threshold value after the set period (for example, 60 seconds), the charging current is stable, the charging current fluctuation period is ended, the efficiency threshold value is changed, and foreign object detection is resumed.

In FIG. 4, the first through fourth current change detection threshold values are 360 mA, 300 mA, 200 mA, and 100 mA. A different efficiency threshold value is set for the charging current each time a current change detection threshold value is exceeded. For example, a first efficiency threshold value is set for a charging current greater than the first current change detection threshold value of 360 mA, a second efficiency threshold value is set for a charging current between the first current change detection threshold value of 360 mA and the second current change detection threshold value of 300 mA, a third efficiency threshold value is set for a charging current between the second current change detection threshold value of 300 mA and the third current change detection threshold value of 200 mA, and a fourth efficiency threshold value is set for a charging current between the third current change detection threshold value of 200 mA and the fourth current change detection threshold value of 100 mA. When the charging current of the battery 52 does not exceed a current change detection threshold value during the set period of time, the charging current is stable, the charging current fluctuation period is ended, the efficiency threshold value is set relative to the charging current, and foreign object detection is resumed. In this drawing, the first efficiency threshold value is 41%, the second efficiency threshold value is 35%, the third efficiency threshold value is 30%, and the fourth efficiency threshold value is 20%.

FIG. 4 shows a situation in which the load of the battery 52 fluctuates and the charging current fluctuates when the battery 52 is being charged at 400 mA in the normal state in which a foreign object has not been set down on the platform. In this drawing, the charging current of the battery 52 falls from 400 mA in the normal state through a plurality of current change detection threshold values. In other words, the charging current of 400 mA falls in successive order through the current change detection threshold values of 360 mA, 300 mA, 200 mA, and 100 mA. Each time the charging current passes a current change detection threshold value, the timer is reset and the count starts again. In other words, the timer begins counting when the current change detection threshold value of 360 mA is passed. When 300 mA is passed, the timer is reset and begins counting again. Similarly, when 200 mA and 100 mA are passed, the timer is reset and begins counting again. When the a current change detection threshold value is not passed by the time the timer times out, the period of charging current fluctuation is considered to be over.

In FIG. 4, the charging current rises and passes the fourth current change detection threshold value before the timer, which started when the charging current passed the fourth current change detection threshold value, has timed out. As a result, it is not determined that the charging current fluctuation period has ended. Because the charging current gradually rises and passes 100 mA, 200 mA, and 300 mA current change detection threshold values, the timer is reset and begins counting each time a current change detection threshold value is passed. After passing the 300 mA current change detection threshold value, the charging current does not pass another current change detection threshold value by the time the timer times out. As a result, it is determined that the charging current fluctuation period has ended.

In FIG. 4, the charging current of the battery 52 which has fallen due to a load fluctuation increases and passes the 300 mA current change detection threshold value. Afterwards, the charging current does not pass another current change detection threshold value by the time the timer has timed out, that is, by the time the set period (60 seconds) has elapsed. In other words, the charging current has not changed. Therefore, when the set time has elapsed, the charging current fluctuation period is ended, the threshold value set to the lowest threshold value is changed to an efficiency threshold value relative to the charging current, and foreign object detection is resumed. Because, in this drawing, the charging current is between the first current change detection threshold value and the second current change detection threshold value when foreign object detection is resumed, the efficiency threshold value is set to the second efficiency threshold value, and foreign object detection is resumed.

In FIG. 4, the charging current exceeds the 300 mA current change detection threshold value, but does not exceed the 360 mA current change detection threshold value indicated by X when the set period (60 seconds) has elapsed. Therefore, the efficiency threshold value is changed to the second efficiency threshold value, and foreign object detection is resumed. In FIG. 4, the charging current passes the first current change detection threshold value, and then passes the second, third and fourth current change detection threshold values (the charging current either rises or falls). However, the foreign object detection threshold value is maintained at the lowest threshold value (level 0) and foreign object detection is not performed because the set period has not elapsed.

As shown in FIG. 4, the method of foreign object detection with a plurality of efficiency threshold values can detect foreign objects when the charging current of the battery 52 is reduced. When foreign object detection is performed when the charging current is low, foreign object detection is indicated. Charging is not suspended, but the charging current is reduced. Alternatively, the charging current can be reduced, foreign object detection can be indicated, and charging of the battery can be continued. When the battery 52 is being charged with a low charging current, the supply of power to the power transmission coil 11 is reduced. Thus, even when a foreign object has been set down on the platform along with the battery-powered device 50, the power supplied to the foreign object is reduced, and the foreign object does not become too hot.

In FIG. 4, when the charging current of the battery 52 is between 300 mA and 360 mA but does not pass a higher or lower current change detection threshold value by the time the set period elapses, the threshold value is set to the second efficiency threshold value (35%), and foreign object detection is resumed. When the charging current of the battery 52 is between 200 mA and 300 mA but does not pass a higher or lower current change detection threshold value by the time the set period elapses, the threshold value is set to the third efficiency threshold value (30%), and foreign object detection is resumed. When the charging current of the battery 52 is between 200 mA and 100 mA but does not pass a higher or lower current change detection threshold value by the time the set period elapses, the threshold value is set to the fourth efficiency threshold value (20%), and foreign object detection is resumed.

Figure 5:
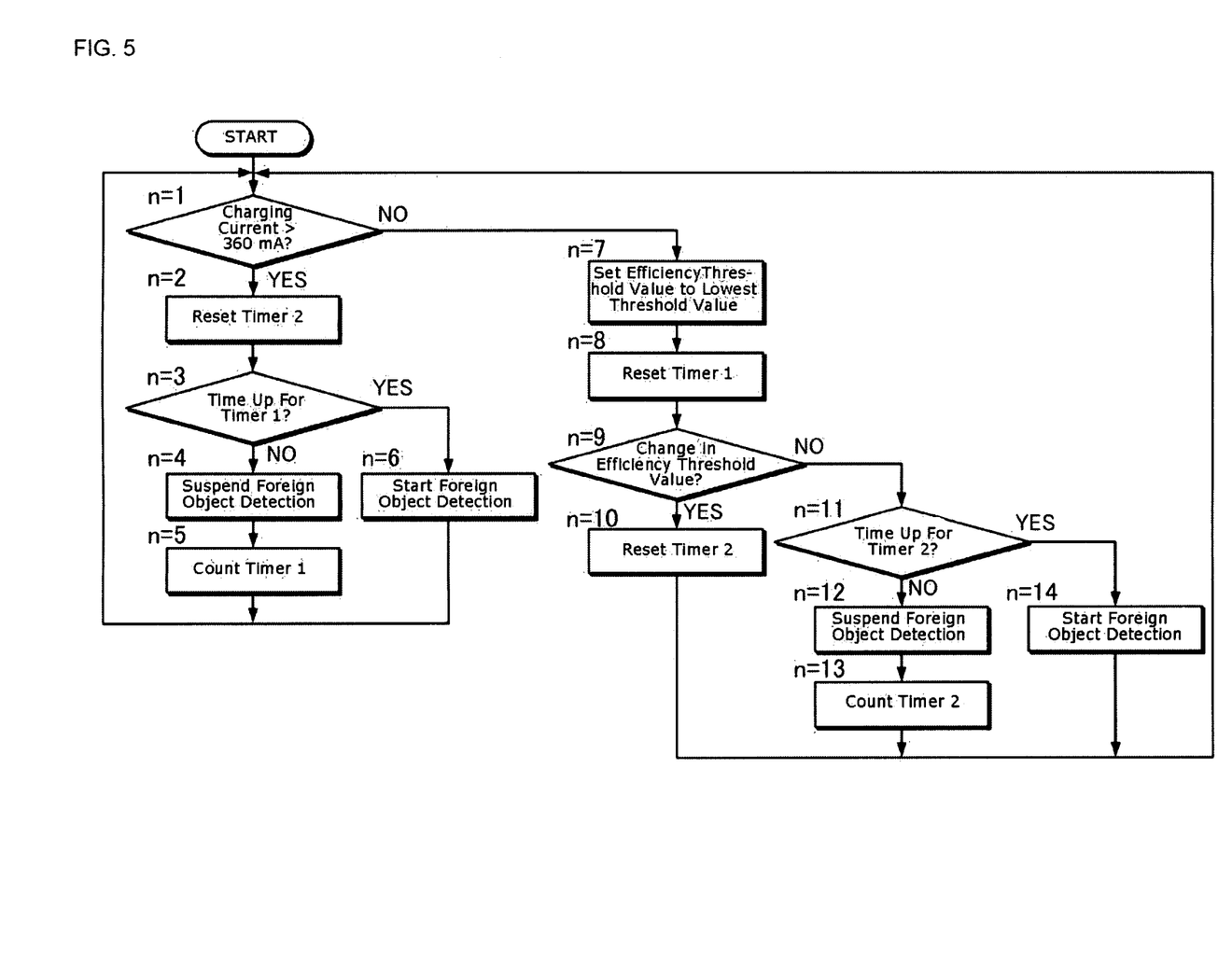
FIG. 5 is a flowchart for detecting a foreign object using the method shown in FIG. 3.

Foreign object detection is performed according the flowchart shown in FIG. 5 and explained below when the charging current changes as shown in FIG. 3. In this charging method, foreign object detection is suspended during the period of battery charging current fluctuation. [Step n=1] The charging current of the battery 52 is detected by the current detection circuit 57. The detected charging current is compared to the 360 mA current change detection threshold value, which is the threshold value for determining whether or not the current of the battery 52 has changed, and it is determined whether the charging current is less than or greater than the current change detection threshold value. In FIG. 3, the battery 52 is charged at 400 mA in the normal state. When the 360 mA current change detection threshold value is not passed, it is determined that the charging current has not changed. When the charging current passes the 360 mA current change detection threshold value, it is determined that the charging current has changed. [Step n=2] When the charging current of the battery 52 is greater than the 360 mA current change detection threshold value, that is, when the charging current has not changed from 400 mA in the normal state, timer 2, which is set for a period of 60 seconds, is reset. Timer 2 counts the time the charging current is below 360 mA. The charging current fluctuation period extends from the time timer 2 begins counting until the timer times out. Therefore, the charging current fluctuation period ends when timer 2 times out. Afterwards, if the detected transmission efficiency is lower than the 41% efficiency threshold value, it is determined that a foreign object has been set down. [Step n=3] It is determined whether or not timer 1 has timed out. Timer 1 is set for a period of 15 seconds. Timer 1 counts the time in which the charging current exceeds the 360 mA current change detection threshold value. The charging current fluctuation period extends from the time the timer 1 starts counting until the time the timer times out. [Steps n=4-6] Steps n=1-5 loop and foreign object detection is suspended until timer 1 times out. In other words, when the charging current exceeds the 360 mA current change detection threshold value, a 15 second charging current fluctuation period begins and foreign object detection is suspended. When timer 1 times out, the process advances to Step n=6, the charging current fluctuation period is ended, and foreign object detection is resumed.

In FIG. 3, because the battery 52 is charged using a 400 mA charging current in the normal state, the charging current always exceeds the 360 mA current change detection threshold value. Therefore, foreign object detection is suspended for the initial 15 seconds, but foreign object detection is performed continuously thereafter. After the charging current has fallen below 360 mA but then risen above the 360 mA current change detection threshold value, foreign object detection is suspended for 15 seconds. However, when the timer 1 times out after this 15 seconds, foreign object detection is resumed in Step n=6. In other words, after the charging current of the battery 52 has fallen below 360 mA but then risen above the 360 mA current change detection threshold value, foreign object detection is resumed after 15 seconds. Foreign object detection is performed by detecting the transmission efficiency from the detected charging current and then comparing the detected transmission efficiency to the efficiency threshold value. At this time, the efficiency threshold value is set, for example, at 41%.

[Steps n=7, 8] When the charging current has fallen below the 360 mA current change detection threshold value, a charging current fluctuation period is established, the efficiency threshold value is set to the lowest threshold value (0%), foreign object detection is effectively suspended, and the timer 1 is reset. [Steps n=9-14] In Step n=9, it is determined whether or not the efficiency threshold value has been changed. Because it is determined that that the charging current had fallen below 360 mA for the first time in Step n=1, the efficiency threshold value is changed to the lowest threshold value of 0% and foreign object detection is suspended. Therefore, it is determined in Step n=9 that the efficiency threshold value has been changed. The process advances to Step n=10, timer 2 is reset, and the process returns to Step n=1. Afterwards, in Step n=1, even though the charging current has fallen below 360 mA, the efficiency threshold value has already been changed to the lowest threshold value. Therefore, it is not determined that the efficiency threshold value has changed in Step n=9 and the process advances to Step n=11 until the efficiency threshold value has been reset to a threshold value other than the lowest threshold value. Afterwards, a charging current fluctuation period is established in Step n=11 through Step n=13 until timer 2 times out. In other words, Steps n=1, 7-9, and 11-13 loop until 60 seconds have elapsed and timer 2 times out. When timer 2 times out, foreign object detection is resumed in Step n=14. Thus, the charging current fluctuation period is ended and foreign object detection is resumed when the charging current falls below the 360 mA current change detection threshold value and timer 2 times out. However, even when the charging current has fallen below the 360 mA current change detection threshold value, a charging current fluctuation period is established, foreign object detection is suspended, and no foreign object detection is performed unless 60 seconds has elapsed while the current continues. In other words, it is determined that the charging current has fallen because of a load fluctuation, and foreign object detection is not performed. When foreign object detection is resumed in Step n=14, the efficiency threshold value is reset from the lowest threshold value of 0% to 41%. When foreign object detection is resumed, the transmission efficiency is detected from the charging current, and the detected transmission efficiency is compared to the reset efficiency threshold value. When the detected transmission efficiency is less than 41%, it is determined that a foreign object has been set down on the platform.

Figure 6:
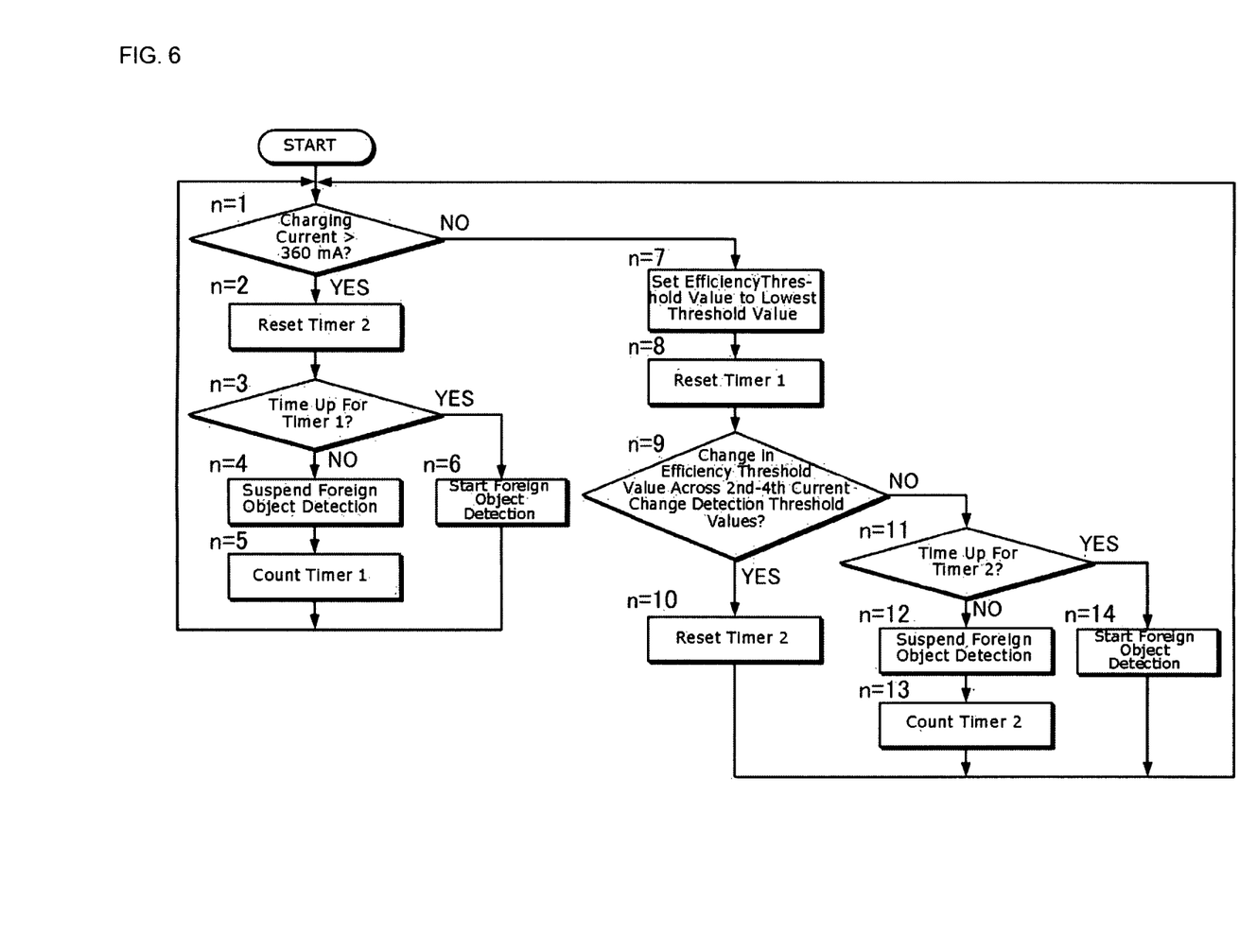
FIG. 6 is a flowchart for detecting a foreign object using the method shown in FIG. 4.

FIG. 6 shows a flowchart in which a plurality of current change threshold values have been provided to perform foreign object detection as shown in FIG. 4. In this flowchart, the set time for determining that the charging current has stabilized after falling below 360 mA is 60 seconds (timer 2), and the set time for determining that the charging current has stabilized after rising above 360 mA is 15 seconds (timer 1). These indicate the conditions under which the charging current fluctuation period has ended. However, the set time for determining that the charging current has stabilized after falling below 360 mA and then rising above 360 mA can be 60 seconds. In this method, a single timer can be used to determine whether the charging current fluctuation period has ended.

[Step n=1] The charging current of the battery 52 is detected by the current detection circuit 57. The detected charging current is compared to the first current change detection threshold value of 360 mA, and it is determined whether the charging current is less than or greater than the first current change detection threshold value. In FIG. 4, the battery 52 is charged at 400 mA in the normal state. When the initially detected charging current is greater than the first current change detection threshold value of 360 mA, it is determined that the charging current has not changed. When the charging current is less than the first current change detection threshold value of 360 mA, it is determined that the charging current has changed. [Step n=2] When the charging current of the battery 52 is greater than the first current change detection threshold value of 360 mA, that is, when the charging current has not changed from 400 mA in the normal state, timer 2, which is set for a period of 60 seconds, is reset. [Step n=3] It is determined whether or not timer 1 has timed out. Timer 1 is set for a period of 15 seconds. Timer 1 counts the time in which the charging current exceeds the first current change detection threshold value of 360 mA. The charging current fluctuation period extends from the time the timer 1 starts counting until the time the timer times out. [Step n=4-6] Steps n=1-5 loop and foreign object detection is suspended until timer 1 times out. In other words, when the charging current exceeds the first current change detection threshold value of 360 mA, a 15 second charging current fluctuation period begins and foreign object detection is suspended. When timer 1 times out, the process advances to Step n=6, the charging current fluctuation period is ended, and foreign object detection is resumed. When foreign object detection is resumed, the transmission efficiency is detected from the charging current, and the detected transmission efficiency is compared to the reset efficiency threshold value. Because the charging current at the end of the fluctuation period is greater than the first current change detection threshold value of 360 mA, the efficiency threshold value used in foreign object detection is set to the first efficiency threshold value of 41%, and foreign object detection is performed.

In FIG. 4, because the battery 52 is charged using a 400 mA charging current in the normal state, the charging current always exceeds the 360 mA current change detection threshold value. Therefore, foreign object detection is suspended for the initial 15 seconds, but foreign object detection is performed continuously thereafter. After the charging current has fallen below 360 mA but then risen above the 360 mA current change detection threshold value, foreign object detection is suspended for 15 seconds. However, when the timer 1 times out after this 15 seconds, foreign object detection is resumed in Step n=6. In other words, after the charging current of the battery 52 has fallen below 360 mA but then risen above the 360 mA current change detection threshold value, foreign object detection is resumed after 15 seconds.

[Steps n=7, 8] When the charging current has fallen below the first current change detection threshold value of 360 mA, a charging current fluctuation period is established, the efficiency threshold value is set to the lowest threshold value (0%), foreign object detection is effectively suspended, and the timer 1 is reset. [Step n=9] The charging current of the battery 52 is detected by the current detection circuit 57, and the detected charging current is compared to the current change detection threshold value to determine whether the charging current has changed across the current change detection threshold value. In the charging method shown in FIG. 4, a plurality of current change detection threshold values are provided: a first current change detection threshold value (360 mA), a second current change detection threshold value (300 mA), a third current change detection threshold value (200 mA), and a fourth current change detection threshold value (100 mA). Because it was determined in Step n=1 whether or not the charging current had crossed the first current change threshold detection value (360 mA), it is determined in this step whether the charging current has crossed the second current change detection threshold value (300 mA), the third current change detection threshold value (200 mA), and the fourth current change detection threshold value (100 mA).

In this step, when the second current change detection threshold value (300 mA), third current change detection threshold value (200 mA), or fourth current change detection threshold value (100 mA) has been crossed between the previously detected charging current and the most recent charging current, it is determined that the charging current has changed across a current change detection threshold value. For example, when the previously detected charging current was within the range from 300 mA (second current change detection threshold value) and 200 mA (third current change detection threshold value), and the most recently detected charging current is within the 300 mA to 200 mA range, it is determined that there has been no change in the charging current. When the most recent charging current is greater than 300 mA (the second current change detection threshold value) or less than 200 mA (the third current change detection threshold value), the charging current is determined to have changed across a current change threshold detection value. It is determined whether or not the charging current has changed across another current change detection threshold value in the same way, namely, by comparing the previously detected charging current to the most recent charging current.

[Step n=10] When the charging current of the battery 52 has changed across any of the second through fourth current change detection threshold values, the timer 2, with is set to a period of 60 seconds, is reset, and the process returns to Step n=1. Timer 2 counts the period of time in which the charging current has remained within a predetermined range without crossing a current change detection threshold value. Timer 2 establishes the period of time from the start of the count to the timing out of the timer as a charge current fluctuation period. [Step n=11-13] When it was determined in Step n=9 that the charging current of the battery 52 had not changed across a current change detection threshold value, it is determined in Step n=11 whether timer 2 has timed out. Until it has been determined in Step n=11 that timer 2 has timed out, a charging current fluctuation period is established, and Steps n=1, 7-9 and 11-13 continue to loop, or Steps n=1, 7-10 continue to loop. In other words, a charging current fluctuation period is established, foreign object detection is suspended, and foreign object detection is not performed until 60 seconds has elapsed and timer 2 has timed out.

[Step n=14] When timer 2 has timed out in Step n=9, the charging current has remained stable over a set period of time, the charging current fluctuation period is ended, and foreign object detection is resumed in this step. The efficiency threshold value used in foreign object detection is reset to the efficiency threshold value corresponding to the size of the latest charging current detected in Step n=9. In other words, when the charging current at the end of the period of fluctuation is between the first current change detection threshold value of 360 mA and the second current change detection threshold value of 300 mA, the efficiency threshold value is set to the second efficiency threshold value of 35%, and foreign object detection is performed. When the charging current is between the second current change detection threshold value of 300 mA and the third current change detection threshold value of 200 mA, the efficiency threshold value is set to the third efficiency threshold value of 30%, and foreign object detection is performed. When the charging current is between the third current change detection threshold value of 200 mA and the fourth current change detection threshold value of 100 mA, the efficiency threshold value is set to the fourth efficiency threshold value of 20%, and foreign object detection is performed. When the charging current at the end of the period of fluctuation is less than the fourth current change detection threshold value of 100 mA, the efficiency threshold value for the charging current is set to 0%. However, when the charging current at the end of the period of fluctuation is less than the fourth current change detection threshold value of 100 mA, the efficiency threshold value for the charging current can also be set to 10%. When foreign object detection is resumed, the transmission efficiency is detected from the charging current and the charging voltage, and the detected transmission efficiency is compared to the reset efficiency threshold value. When the detected transmission efficiency is less than the reset efficiency threshold value, it is determined that a foreign object has been set down on the platform.

In this non-contact charging method, a current change detection threshold value is provided to detect a fluctuation in the charging current, a timer is started each time the charging current exceeds the current change detection threshold value, and foreign object detection is suspended until the timer times out, which is treated as the charging current fluctuation period. As a result, current changes are not detected when there are slight changes in the charging current of the battery, and foreign objects can be reliably detected. However, the non-contact charging method of the present invention does not have to use this means to detect changes in the charging current of a battery. For example, current changes can be detected using a change value indicating the change in the charging current per unit time. Alternatively, a change in the charging current can be detected by detecting the rate of change in the charging current as a function of time, that is, by detecting the slope of the change in the charging current over time.

Now that the invention has been described, what is claimed is:

1. A non-contact charging method comprising setting down a battery powered device on a charging platform, electromagnetically coupling a power receiving coil in the battery-powered device to a power transmission coil in the charging platform, transmitting power from the power transmission coil to the power receiving coil by electromagnetic induction, and charging a battery in the battery-powered device using power induced in the power receiving coil,
the non-contact charging method further comprising:
detecting the charging current of the battery on the battery-powered device side;
detecting the transmission efficiency from the charging current;
comparing the detected transmission efficiency to an efficiency threshold value;
determining that a foreign object has been set down on the charging platform when the detected charging efficiency is less than the efficiency threshold value and determining that a foreign object has not been set down on the charging platform when the detected charging efficiency is greater than the efficiency threshold value; and
suspending foreign object detection during a time period when fluctuation in the charging current occurs;
wherein, when the fluctuation occurs in the charging current of the battery and the charging current temporarily rises above or falls below a current change detection threshold value, a period of time including the rise or fall in the charging current above or below the current change detection threshold value is the fluctuation in the charging current when the period of time is shorter than a set time period, and foreign object detection is suspended during this time period.

2. A non-contact charging method according to claim 1, wherein, when a charging current greater than the current change detection threshold value falls below the current change detection threshold value or a charging current less than the current change detection threshold value rises above the current change detection threshold value, a predetermined time period after the charging current passes the current change detection threshold value is the fluctuation in the charging current, and foreign object detection is suspended during this predetermined time period.

3. A non-contact charging method according to claim 1, wherein the charging current for the battery is detected on the battery-powered device side, the detected charging current and the efficiency threshold value are transmitted to the charging platform, and the charging platform performs foreign object detection from the charging current and the efficiency threshold value.

4. A non-contact charging method according to claim 1, wherein the power supplied to the power transmission coil is controlled when the foreign object is detected on the charging platform.

5. A non-contact charging method according to claim 1, wherein the efficiency threshold value used to compare the detected transmission efficiency is set to a lowest threshold value, and foreign object detection is effectively stopped during the time period in which the fluctuation in the charging current occurs.

6. A non-contact charging method according to claim 5, wherein the lowest threshold value is level 0.

7. A non-contact charging method according to claim 1, wherein the supply of power to the power transmission coil is stopped and charging of the battery is stopped, or the power introduced to the power transmission coil is reduced below a power setting, and the amount of charging current for the battery is reduced when a foreign object is detected.

* * * * *